March 13, 1928.
E. J. WESP
1,662,094
ADJUSTABLE BEARING
Filed May 22, 1926
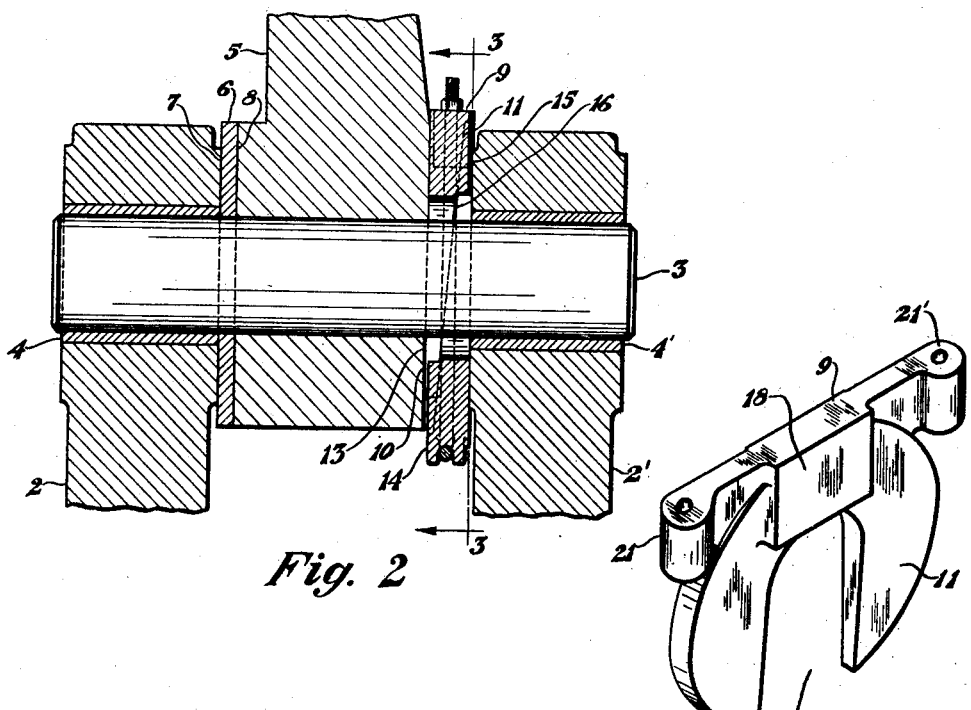
Fig. 2
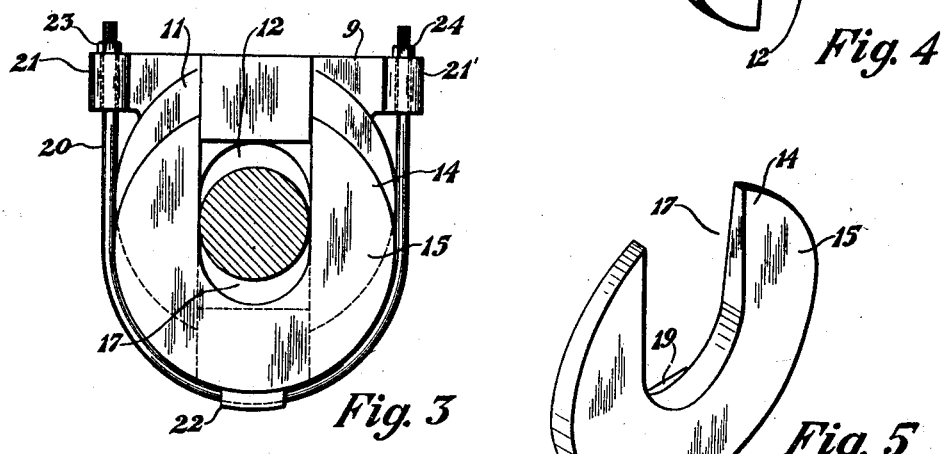
Fig. 3
Fig. 4
Fig. 5
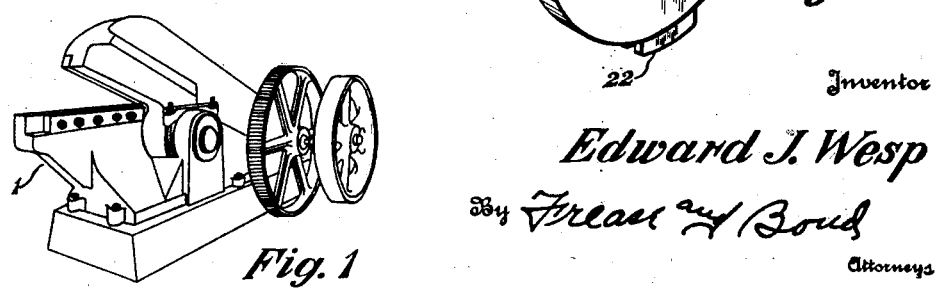
Fig. 1
Inventor
Edward J. Wesp
By Fream and Boud
Attorneys Patented Mar. 13, 1928.

1,662,094

UNITED STATES PATENT OFFICE.

EDWARD J. WESP, OF CANTON, OHIO, ASSIGNOR TO THE CANTON FOUNDRY & MACHINE COMPANY, OF CANTON, OHIO, A CORPORATION OF OHIO.

ADJUSTABLE BEARING.

Application filed May 22, 1926. Serial No. 110,858.

The invention relates to adjustable bearings and more particularly to adjustable thrust bearings for apparatus such as alligator shears and the like, where heavy loads are applied to the thrust bearings and where an excessive amount of play caused by the wearing of a thrust bearing of the usual type greatly impairs the efficiency of the shears.

The objects of the invention are to provide means for taking up this wear on the bearings which take the thrust load of the shears and the like.

These objects are attained by a construction and arrangement which may be described in general terms as including a thrust bearing having one face inclined to the direction of the line of thrust, a second thrust bearing having one face inclined to the direction of the line of thrust and abutting the inclined face of the other bearing, and means for slidably adjusting the abutting bearing faces.

A preferred embodiment of the invention is illustrated in the accompanying drawing, forming part hereof, in which—

Figure 1 is a perspective view of an alligator shear equipped with the improved thrust bearing;

Fig. 2, a vertical section through the housing and arm of an alligator shear, showing the improved thrust bearing in use;

Fig. 3, a sectional view taken on the line 3—3, Fig. 2;

Fig. 4, a perspective view of one section of the adjustable bearing; and

Fig. 5, a perspective view of the other section of the bearing.

Similar numerals of reference indicate corresponding parts throughout the drawing.

An alligator shear indicated generally at 1, includes frame members 2 and 2', in which a shaft 3 is suitably journaled in bearings 4 and 4', and on which shaft a shear arm 5 is rotatably mounted. A plain thrust washer 6 is carried on the shaft 3 intermediate the face 7 of the frame member 2 and face 8 of the shear arm 5.

A thrust washer 9 having one face 10 at right angles to the axis of the shaft 3 and the other face 11 inclined slightly to the axis, is slotted as shown at 12 and forms a U for slidable adjustment over the shaft 3. The U washer 9 is so placed as to bring the face 10 against the face 13 of the shear arm 5.

A thrust washer 14 having one face 15 at right angles to the axis of the shaft 3 and the other face 16 slightly inclined to the axis, is slotted as shown at 17 and forms a U for slidable adjustment over the shaft 3. The U washer 14 is so placed as to bring the inclined face 16 in cooperation with the inclined face 11 of the U washer 9, the lug 18 of the washer 9 engaging with the slot 17 of the washer 14, and the lug 19 of the washer 14 engaging with the slot 12 of the washer 9.

A substantially U shaped bolt 20 passes through the equally spaced lugs 21 and 21' of the washer 9, and the grooved peripheral lug 22 of the washer 14, and has the nuts 23 and 24 on its outer ends for slidably adjusting the two washers in abutting cooperation with each other.

The operation of the adjustable bearing is as follows. Assuming that the thrust load has caused a wearing of the surfaces of the frame faces, the surfaces of the thrust washer 6, surfaces of the shear arm 5 and surfaces 10 and 15 of the thrust washers 9 and 14, a longitudinal sliding of the shear arm 5 along the shaft 3 would occur. This would allow the separation of the shearing edges of the knives of the shears, thereby causing an imperfect shearing action.

The proper tight adjustment between the shearing edges may then be obtained by manipulation of the adjustable thrust bearing herein set forth, by screwing up the nuts 23 and 24 to laterally abut the arm 5 against the washer 6 as tightly as may be desired, this abutment being attained by the wedging action of the inclined faces of the washers 9 and 14 sliding over each other.

I claim:

1. An adjustable bearing including a pair of washers, each washer having opposite faces inclined to each other, one of the faces of one of the washers abutting one of the faces of the other washer, and adjustable means maintaining the washers in abutment with each other, and the adjustable means including a U bolt engirdling peripheral portions of one of the washers, and means adjustably securing the ends of the U bolt on the other washer.

2. An adjustable bearing including a pair of slotted washers, each washer having opposite faces inclined to each other, one of the faces of one of the washers abutting one of the faces of the other washer, and adjustable means maintaining the washers in abutment with each other, and the adjustable means including a U bolt engirdling peripheral portions of one of the washers, and means adjustably securing the ends of the U bolt on the other washer.

3. An adjustable bearing including a pair of U washers, each washer having opposite faces inclined to each other, one of the faces on one of the washers abutting one of the faces of the other washer, and adjustable means maintaining the washers in abutment with each other, and the adjustable means including a U bolt engirdling peripheral portions of one of the washers, and means adjustably securing the ends of the U bolt on the other washer.

4. An adjustably bearing including a pair of slotted washers, each washer having opposite faces inclined to each other, one of the faces of one of the washers abutting one of the faces of the other washer, and adjustable means maintaining the washers in abutment with each other, there being a lug on the abutting face of one of the washers slidable in the slot of the other washer, and the adjustable means including a U bolt engirdling peripheral portions of one of the washers, and means adjustably securing the ends of the U bolt on the other washer.

5. In combination a shaft, a pair of spaced bearings on the shaft, a member movable on the shaft and abutting one of the bearings, an adjustable bearing between the movable member and the other bearing including a pair or washers, each washer having opposite faces inclined to each other, one of the faces of one of the washers abutting one of the faces of the other washer, the other faces of the washers abutting the movable member and the bearing, and adjustable means for varying the pressure between the abutting parts, and the adjustable means including a U bolt engridling peripheral portions of one of the washers, and means adjustably securing the ends of the U bolt on the other washer.

In testimony that I claim the above, I have hereunto subscribed my name.

EDWARD J. WESP.